June 9, 1931.  J. GAVRILOFF  1,809,687
WEED PICKER
Filed Oct. 3, 1929  2 Sheets-Sheet 2
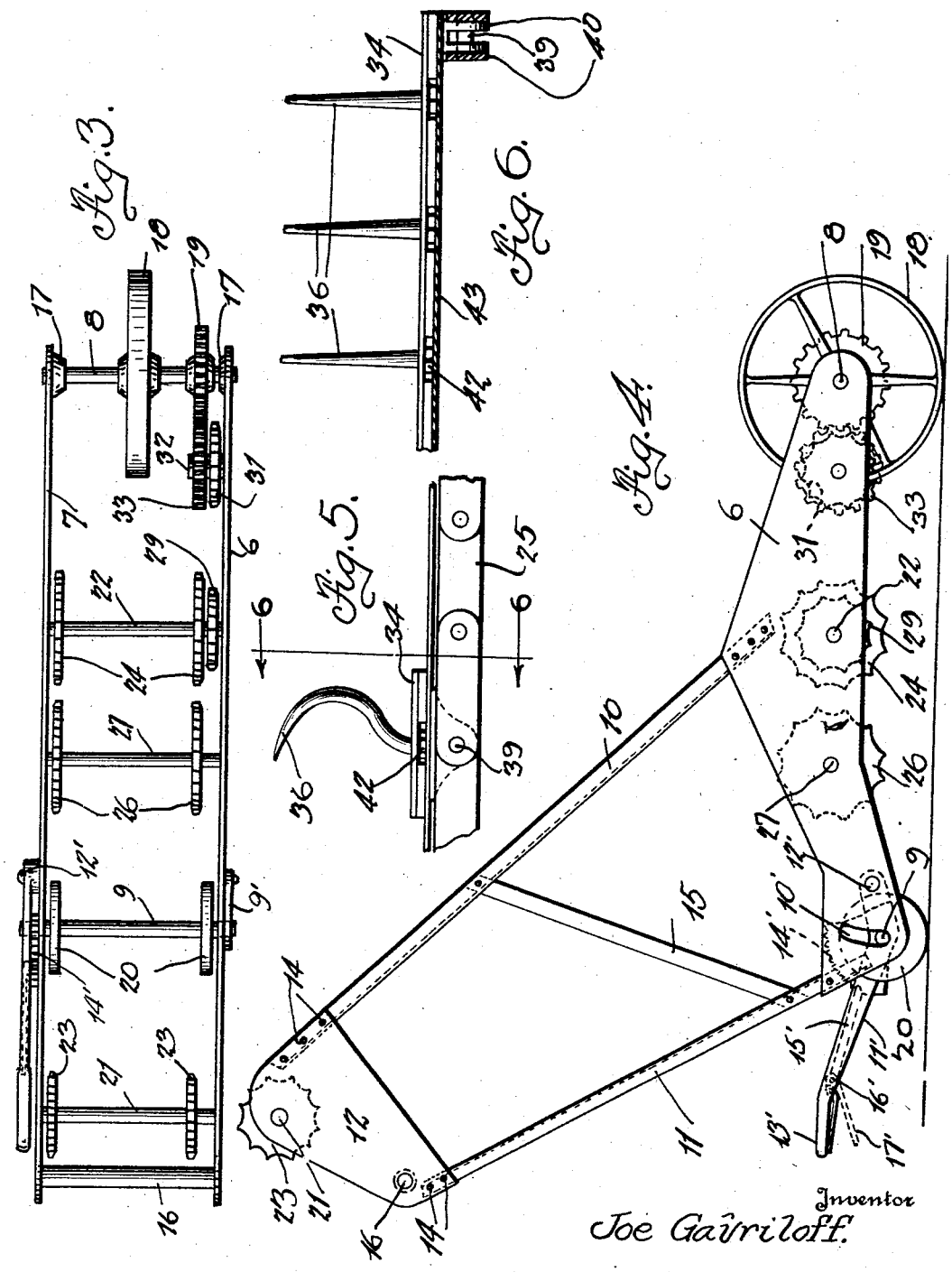
Inventor
Joe Gavriloff.

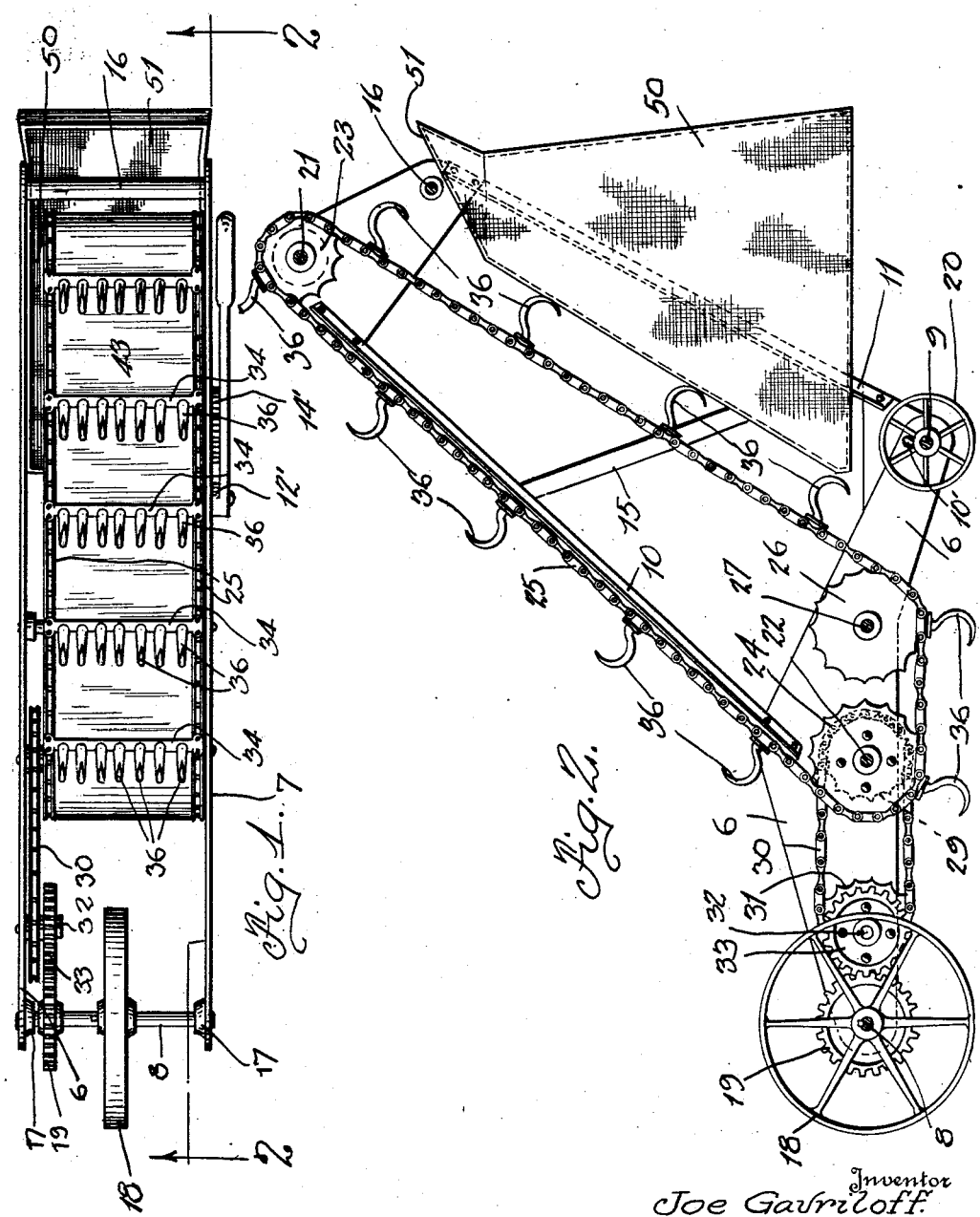

Patented June 9, 1931

1,809,687

UNITED STATES PATENT OFFICE

JOE GAVRILOFF, OF KENT, OHIO

WEED PICKER

Application filed October 3, 1929. Serial No. 397,084.

This invention relates to improvements in weed pickers of the traction operated type.

The primary object of this invention is to provide a traction operated weed picker having an endless chain to which is secured a plurality of weed gripping fingers.

A further object of this invention is to provide a device of the above mentioned character comprising a manually operated wheeled frame, for the endless chain arrangement of weed gripping fingers.

A still further object of this invention is to provide a device of the above mentioned character having a receptacle for collecting the weeds after they have been picked by the weed fingers on the endless chain.

Other objects and advantages of the invention will become apparent during the course of the following description of the drawings forming a part of this specification and in which, Figure 1 is a top elevational view of the invention showing the general arrangement of the traction operated weed gripping fingers;

Figure 2 is a longitudinal cross-sectional view taken on line 2—2 of Figure 1, showing the general construction of the wheeled frame and the arrangement of the traction wheel relative to the endless chain of weed gripping fingers;

Figure 3 is a bottom plan view, showing the endless chain of weed gripping fingers removed and the weed collecting receptacle also removed from the wheeled frame;

Figure 4 is a side elevational view of the wheeled frame showing the parts removed with the exception of the traction wheel and the gearing for driving the endless weed chain;

Figure 5 is a fragmentary view of the endless chain showing the manner of securing the weed picking fingers; and Figure 6 is a fragmentary cross-sectional view taken on line 6—6 of Figure 5, showing one of the bars for holding the weed gripping fingers.

For the purpose of a more detailed description reference will be directed to the drawings wherein the reference character 5 will be generally employed to designate a wheeled frame, comprising triangular side frame members 6 and 7, spaced by a wheel axle 8, at the forward portion thereof and a wheel axle 9, at the rear portion thereof.

A pair of side bars 10 and 11 are secured to the intermediate section of the side frames 6 and 7 and the rear portions thereof respectively. Each pair of side bars 10 and 11 are connected by side plates 12 and 13 by means of rivets 14 forming an upper frame. A brace bar 15 has its ends secured to each pair of side bars 10 and 11 as more clearly shown in Figure 4 for further bracing the side bars against movement, while a cross-bar 16 in the form of a handle is secured to each of the side plates 12, in any well known manner.

The wheel axle 8 has its ends journaled in the side frame members 5 and 6 for free rotation as at 17 in suitable bearings. Rigidly mounted on the wheel axle 8 are a traction wheel 18 and a driving gear 19 for causing the operation of the weed gripping fingers which will be later described.

A pair of adjustable supporting wheels 20 are rigidly mounted on the wheel axle 9 which is journaled at one end in a pivoted arm 9' and is adapted to be adjusted for causing the axle 9 to move vertically in the substantially vertical arcuate slots 10' of the side frames 6 and 7. The opposite end of the wheel axle 9 is journaled in a lever 11' pivoted at 12' to the side frame 7. A handle 13' is formed on the lever 11' for raising the wheel axle 9 vertically and a ratchet sector 14' is secured to the side frame 7 adapted to be engaged by a pawl 15' pivoted to the handle 11' as at 16'. An extension 17' is formed on the pivoted pawl 15' whereby the wheel axle 9 may be adjusted vertically and locked in its adjusted position by means of the pawl 15' and ratchet 14' relative to the openings 10' in the rear portion of the side frames 6 and 7.

Mounted in the side plates 12 and side frames 6 and 7 are shafts 21 and 22 respectively for free rotation and rigidly secured to the shafts 21 and 22 are sprocket wheels 23 and 24 respectively over which passes sprocket chain 25 of an endless weeder. An idle sprocket wheel 26 is provided for each of the sprocket chains 25 and they are mounted for free movement on the axle shaft 27 having its ends journaled in the side frames 6 and 7.

The axle shaft 22 is provided with a sprocket wheel 29 adapted to be driven by a sprocket chain 30 which passes over a similar sprocket wheel 31, mounted on a stub shaft 32 in the side frame 6. A gear 33 is also mounted on the stub shaft 32 for meshing with the gear wheel 19, whereby a complete driving connection is obtained between the wheel axle 8 and the driving shaft 22.

A series of bars 34 have their ends secured to the sprocket chains 25 as shown more clearly in Figures 1 and 2, and the bars 34 are mounted thereon in spaced relation by means of fastening means. Secured to the bars 34, is a plurality of weed gripping fingers 36, which are hook shaped and pointed at their free ends, for digging into the earth and pulling up weeds and the roots thereof.

In Figures 5 and 6 is shown the sprocket chain 25, formed by a plurality of connected links as usual. The bars 34 are secured to the joining pins 39, by the angle pieces 40 on the ends thereof.

Each of the weed gripping fingers 36 is provided with a screw threaded end which passes through an opening in the bars 34 and is held in place by nuts 42.

A belt of canvas 43 may be applied to the bars 34 as shown in Figures 5 and 6 for preventing foreign matter from dropping upon the gearing and causing undue wear.

A receptacle 50 having an opening 51 at the top may be also applied to the pair of side bars 11 and supported thereby for collecting the weeds and foreign matter carried upwardly by the weed gripping fingers 36.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. A weeder of the character described comprising a wheeled frame, an endless weeder supported thereon and operatively engaged with the frame wheels, said frame having substantially vertical arcuate slots at one end, a wheel axle movable in the slots, a lever associated with the axle for raising and lowering the same for varying the depth of cut of the weeder, and means for holding the axle in adjusted positions.

2. A weeder of the character described comprising a wheeled frame, an endless weeder supported thereon and operatively engaged with the frame wheels, said frame having substantially vertical arcuate slots at one end, a wheel axle movable in the slots, a lever associated with the axle for raising and lowering the same for varying the depth of cut of the weeder, and means for holding the axle in adjusted positions, an upper frame on the wheeled frame in which the endless weeder is mounted and including side bars anchored at their lower ends to the wheeled frame, side plates connecting the upper ends of the side bars and wheels journalled in the wheeled frame and side plates over which the endless weeder travels.

In testimony whereof I affix my signature.

JOE GAVRILOFF.